US008689289B2

(12) United States Patent
Birnbach et al.

(10) Patent No.: US 8,689,289 B2
(45) Date of Patent: Apr. 1, 2014

(54) GLOBAL OBJECT ACCESS AUDITING

(75) Inventors: Marcelo J. Birnbach, Redmond, WA (US); Daniel Carver, Redmond, WA (US); Brian Lounsberry, Redmond, WA (US); George Li, Redmond, WA (US); Felix Kasza, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1090 days.

(21) Appl. No.: 12/244,441

(22) Filed: Oct. 2, 2008

(65) Prior Publication Data

US 2010/0088738 A1 Apr. 8, 2010

(51) Int. Cl.
*G06F 21/00* (2013.01)
(52) U.S. Cl.
USPC .................... 726/2; 726/1; 726/27; 707/785
(58) Field of Classification Search
None
See application file for complete search history.

(56) References Cited

U.S. PATENT DOCUMENTS

| | | | | |
|---|---|---|---|---|
| 7,730,094 | B2* | 6/2010 | Kaler et al. | 707/785 |
| 7,958,150 | B2* | 6/2011 | Bird | 707/785 |
| 2003/0074580 | A1* | 4/2003 | Knouse et al. | 713/201 |
| 2005/0055380 | A1* | 3/2005 | Thompson et al. | 707/200 |
| 2006/0248585 | A1* | 11/2006 | Ward et al. | 726/20 |
| 2007/0011746 | A1 | 1/2007 | Malpani | |
| 2007/0027872 | A1* | 2/2007 | Johnson et al. | 707/9 |
| 2007/0136578 | A1* | 6/2007 | Dubhashi et al. | 713/167 |
| 2007/0156691 | A1* | 7/2007 | Sturms et al. | 707/9 |
| 2007/0266421 | A1 | 11/2007 | Vaidya | |
| 2008/0022358 | A1* | 1/2008 | Agarwal et al. | 726/1 |
| 2008/0065640 | A1 | 3/2008 | Shulman | |
| 2008/0066146 | A1* | 3/2008 | Dillaway | 726/1 |

FOREIGN PATENT DOCUMENTS

WO WO-2005069823 8/2005

OTHER PUBLICATIONS

Eyres, David "Active Privilege Management for Distributed Access Control Systems", Retreived from: <http://www.cl.cam.ac.uk/~dme-26/Eyers_PhD_Thesis.pdf> on Jul. 10, 2008, (Jun. 12, 2005), pp. 1-204.
Judge, Paul "Gothic: A Group Access Control Architecture for Secure Multicast and Anycast", *INFOCOM 2002*, Available at <http://www-r2.u-strasbg.fr/~hoerdt/papers/All/200206%20Gothic%20A%20group%20Access%20Control%20Architecture%20for%20Secure%20Multicast%20and%20Anycast.pdf>,(2002),10 pages.
McDaniel, Patrick "Ismene: Provisioning and Policy Reconciliation in Secure Group Communication", *Electrical Engineering and Computer Science Department*, University of Michigan, Available at <https://www.eecs.umich.edu/techreports/cse/00/CSE-TR-438-00.pdf>,(2000), pp. 1-21.
Sloman, Morris "Security and Management Policy Specification", *IEEE Network Special issue on Policy Based Networking*, Available at <http://pubs.doc.ic.ac.uk/IEEEnetworkSurvey/IEEEnetwork-Survey.pdf>,(Mar. 2002), pp. 1-21.
Xie, Chao "Access Control of Global Distributed Storage System", Retrieved from http://ieeexplore.ieee.org/iel5/9381/29791/01357223.pdf?tp=&arnumber=1357223&isnumber=29791, IEEE,(2004), 6.

* cited by examiner

*Primary Examiner* — Michael R Vaughan
(74) *Attorney, Agent, or Firm* — Wolfe-SBMC

(57) ABSTRACT

Global object access auditing techniques are described. In an implementation, a global SACL for a resource and an object SACL are merged to form a merged SACL responsive to a request for access to an object. The merged SACL is checked to determine what activity is to generate an audit event.

20 Claims, 5 Drawing Sheets

GLOBAL OBJECT ACCESS AUDITING

BACKGROUND

The increasing popularity of computers and networking allows users to interact in a wide variety of ways that were not previously available. Computers joined in a network permit users to access data and interact in a common environment. For example, users can share data, collaborate, communicate, and so on with other users that have computers within the network.

Due to computers' ability to interact in many different ways and share data, managing computer networks can be a difficult task. Often times, network managers attempt to balance a network's "openness" with security concerns. In addition to potential theft or destruction of data, if computer and network security consume a large amount of the network's processing resources, users may miss out on wide range of benefits provided by networked computers. To address security concerns, users are assigned user names and passwords to access resources, such as computers, drives, and so on in the network.

For many organizations, much of the organization's overall productivity and economic assets are tied to its computer network and associated data. Accordingly, inefficient computer and/or network security may have a large impact on productivity and/or the economic value of an organization.

SUMMARY

Global object access auditing techniques are described. In an implementation, a global SACL for a resource and an object SACL are merged to form a merged SACL responsive to a request for access to an object. The merged SACL is checked to determine what activity is to generate an audit event.

In an implementation, one or more computer readable media include instructions that are executable to check a merged SACL to determine what activity is to generate an audit event, in which the merged SACL is concatenated from a global SACL for a file system and an object SACL for the object. An audit record is generated corresponding to the audit event.

In an implementation, a global SACL is defined for a resource, including a plurality of objects, in a group policy. The group policy is distributed such that one or more processors associated with the resource, in response to an attempt to access a particular object, merges the global SACL with a SACL for the object to audit the attempt to access the particular object.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "module," for instance, may refer to system(s), computer-readable instructions (e.g., one or more computer-readable storage media having executable instructions), and/or procedure(s) as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The use of similar reference numbers in different instances in the description and the figures may indicate similar or identical items.

DETAILED DESCRIPTION

Overview

Figure 1:
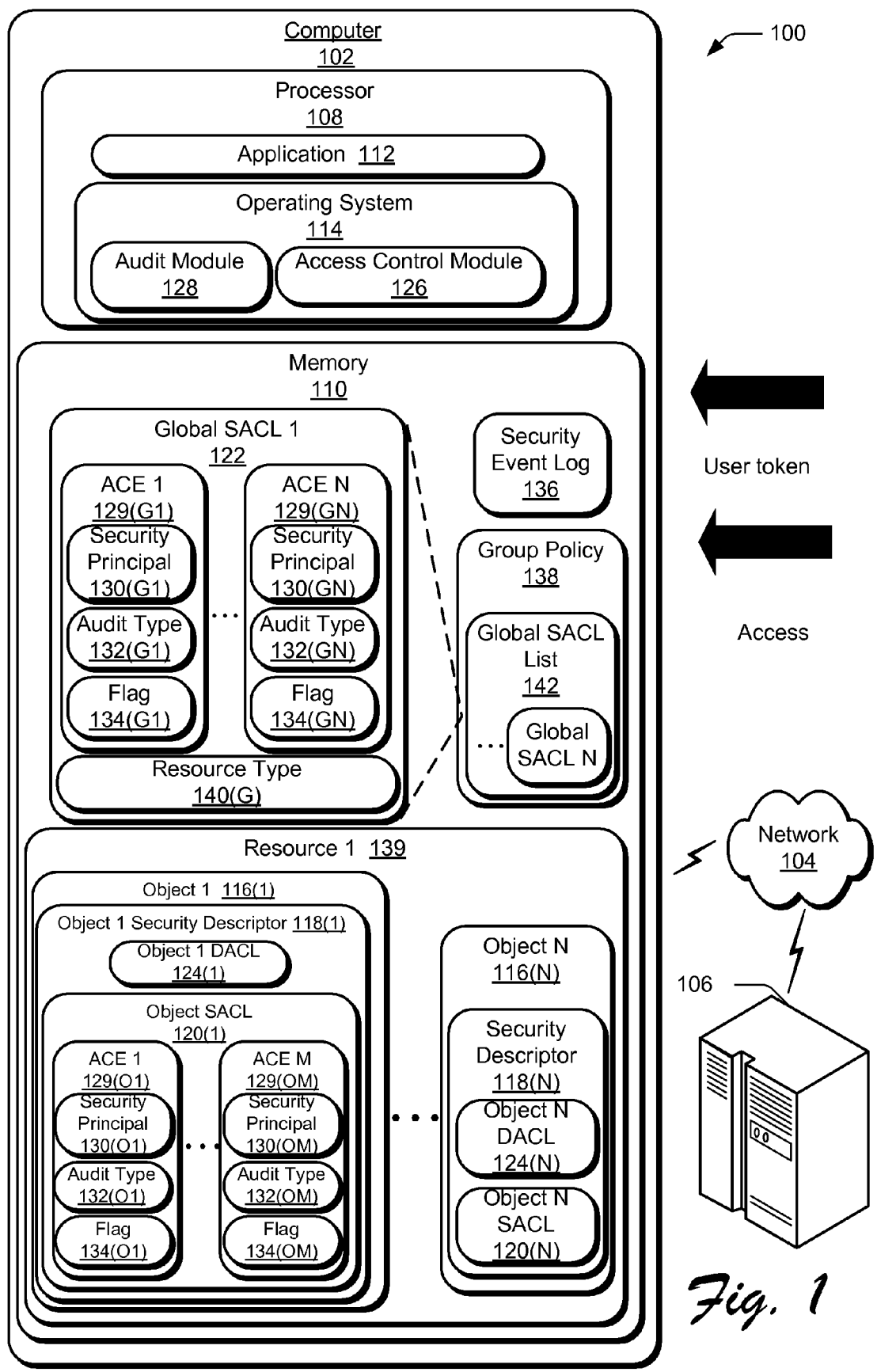
FIG. 1 is an illustration of an environment in an example implementation that is operable to employ global object access auditing.

Managing networked resources (e.g., computers, servers, printers, and so on) can be complex. For instance, the ability of networked resources to share data, collaborate, interact, and so forth are balanced against security concerns when managing networked resources. Take for example a corporate intranet. Data theft and destruction of data are just some of the potential security concerns that may arise as part of managing the resources in the corporate intranet. Additionally, corporate networks are often the subject of regulatory oversight. Thus, in addition to addressing security concerns, the network may be subject to an audit in which proof of what security measures are in place may be requested. For example, a corporation may want to "know" what files a former employee was working on just before the employee left the corporation.

While security is a primary concern, too much security may stifle productivity. For instance, security may consume computing resources that otherwise may be directed to supporting an organization's purpose. For example, auditing access to various resources and objects may involve using a server's processing resources that would otherwise be available to support user activities.

In addition to securing the data and computers, records are kept to prove what security measures have been taken to secure the data and computers. For example, a system access control list (SACL) included in a security descriptor for the object may be used to select what activity is to be tracked. Thus, while a discretionary access control list (DACL)) may be used to protect the object, the SACL may be used to track activities.

Techniques are described for global object access auditing. By implementing global object access auditing techniques, access to objects and/or resources may be tracked while minimizing processor overhead in comparison to traditional security techniques.

In an implementation, a global SACL and an object SACL are merged in response to a request for an object. The object SACL may be obtained from a security descriptor associated with the requested object. For example, a merged SACL may be formed from the global and object SACLs in response to a user attempting to read a word processing file. An identifier, that is associated with the request for the object, is checked with security descriptor associated with the object (e.g., DACL) to determine whether access is permitted to the object. The identifier may be a user token that includes user information and the groups to which it belongs. Accordingly, the merged SACL may be used to determine what activity is to be tracked.

In the following discussion, an "Example Environment" is first described that may employ global object access auditing techniques to track one or more activities associated with an attempt to access an object. A sample system is then described. "Example Procedures" are also described that may be employed in the example environments, as well as in other environments. Although these, systems and procedures are described as employed within a networked computing environment in the following discussion, it should be readily apparent that these structures, modules, techniques, and approaches may be incorporated within a variety of environments without departing from the spirit and scope thereof.

Example Environment

FIG. 1 is an illustration of an environment 100 in accordance with one or more embodiments. The environment 100 includes a resource, an example of which is illustrated as a computer 102. The computer 102 is communicatively coupled by a network 104 to one or more other resources (e.g., a server 106 is illustrated). The network 104 may employ a wide variety of communication methodologies, hardware, and so on. For example, the network 104 may be representative of a wired or wireless network used by an organization, such as a business. The network 104 may be an intranet, a wide area network, an extranet, the Internet, and so on. Exemplary components of the network may include, but are not limited to: computers, mobile computing devices, servers, data storage systems, printers, scanners, and so forth.

The computer 102 is illustrated as including a processor 108 and memory 110 that are representative of a variety of processing and storage capabilities that may be provided by the computer 102. While the computer 102 is illustrated as including a single processor 108 and memory 110, the processor 108 and/or the memory 110 may each be representative of one or more devices. For instance, the processor 108 may be representative of a single central processing unit or a plurality of central processing units.

Processor(s) are not limited by the materials from which they are formed or the processing mechanisms employed therein. For example, processor(s) may be comprised of semiconductor(s) and/or transistors (e.g., electronic integrated circuits (ICs)) that execute instructions to provide one or more applications (one memory 110 is illustrated). Sample processor mechanisms may include, but are not limited to, quantum computing, optical computing, mechanical computing (e.g., using nanotechnology), and so on. Likewise, although a single memory 110 is illustrated, a wide variety of types and combinations of memory may be employed, such as random access memory (RAM), read only memory (ROM), hard disk memory, removable medium memory, and other types of computer-readable media. The memory 110, for example, may be used to store instructions used by the processor 108 to provide the application 112 and programs.

The computer 102 is illustrated as executing an operating system 114 on the processor 108, which is also storable in the memory 110. The operating system 114 may control the overall function of applications, programs, and operations associated with the computer 102. The operating system 114 may, for example, provide a platform for an application 112 to be executed without the application having to "know" how the computer 102 is configured.

For example, the operating system 114 may be representative of functionality to "abstract" underlying functionality of the computer 102. The operating system 114 may, for example, provide a foundation for the application 112 to be executed on the computer 102 without having to "know" the specific configuration of the computer 102, e.g., without "knowing" which particular "kind" of processor 108, amount of memory 110, and so on, are employed by the computer 102.

As illustrated, a plurality of objects (objects "1" through "N" are illustrated 116(1)-116(N)) are included in memory 110. Example objects include, but are not limited to a file, a registry key, file share, and so on. Each of the objects may include security descriptor (e.g., security descriptor 118(1) for object "1" 116(1)) that may be used to control security aspects associated with object "1" 116(1). In some implementations objects may be grouped by resource. For example, objects one through 5 may be included in a first file system or registry, while objects six through ten are included in a second file system.

As illustrated the security descriptor 118(1) include an object SACL 120(1) that may designate what activity is to be tracked for the object. For example, a media file containing "vacation video" in the memory 110 may have a corresponding object SACL 120(1) including access control entries (ACE) "1" through ACE "M", respectively, 129(O1) through 129(OM) that specifies what type of access activity for the vacation video are to be audited, e.g., success, failures, read, write, and so on. Further, a global SACL 122 may be defined for a resource (e.g., the memory 110) that is used to store the vacation video.

In addition, the security descriptor may include a DACL (e.g., DACL 124(1) for object "1" 116(1)) that may be used in determining whether access is permitted to the object (used in MICROSOFT WINDOWS OPERATING SYSTEM (which are registered trademarks of the Microsoft Corp., Redmond, Wash.).

As illustrated the computer 102 includes an access control module 126. The access control module 126 is representative of functionality that is operable to determine whether access is permitted to an object associated with a resource. Example resources include, but are not limited to a file system, the application 112, the computer 102, a registry, and so on.

For example, when a request is received to open a pointer to the resource and/or the object, the access control module 126 may determine whether access is to be permitted or denied. In the preceding example, the resource may be a word processing application and the object may be a file containing data for a letter. The access control module 126 may make the determinations (e.g., whether to grant access to the resource and/or the object) by using the security descriptor for the object, e.g., object "1" DACL 124(1). For example, the access control module 126 may use the object "1" DACL 124(1) to determine whether an identifier, such as a user token associated with the attempted access, contains proper data that may be used to commence a session, e.g., is permission given to access object "1" 116(1).

As illustrated an audit module 128 is included in the computer 102. The audit module 128 is representative of functionality to audit access to resources and/or objects (e.g., whether access is ultimately permitted or not). For example, in response to the access control module 126 receiving a request for access, the audit module 128 may track one or more activities specified in one or more of the global SACL "1" 122 (also referred to as global SACL 122), a merged SACL, or the object SACL. Data associated with the activity may be included in an audit record. Data associated with the activity may include, but is not limited to the request for access; an identifier associated with the request for access; whether access was permitted or denied; what level of access was permitted (e.g., read-only, read/write, delete, and so on); a user name associated with the request; what access control entries in the DACL where applied; a time of the request; what resources and/or objects were targeted by the request; when access is permitted, what actions were performed (e.g., a file was annotated; and so on. The data associated with the activity may be stored in the memory 110 and/or forwarded for centralized storage to document security compliance for the resource and/or objects.

As will be further described in detail, the audit module 128 may be configured to merge the global SACL 122 with the object SACL (e.g., one of the object SACLs 120(1)-120(N)) at runtime (e.g., in response to a request for access for to an associated object) to determine what activity is to be audited. Although one global SACL 122 is primarily illustrated a group, such as list of global SACLs may be included, e.g., one list of global SACLs per resource type. As illustrated the global SACL 122 may include a list of access control entries (ACE) "1" through "N" (referenced as 129(G1) and 129 (GN)). For example, individual global SACLs may be included for each resource manager (managing resource "1" 139). Accordingly, to determine what activity is to be tracked, the audit module 128 may merge the global SACL 122 with the object SACL (e.g., the SACL lists, such as for ACEs "1" through "N", respectively, 129(G1), 129(GN) for the global SACL 122 with ACEs "1" through "M", respectively, 129 (O1), 129(OM) for object SACL 1 120(1))) to enforce auditing from the global SACL 122 while minimizing processor overhead in comparison to traditional techniques. By configuring the audit module 128 to merge the global SACL 122 and the object SACL 120(1) at runtime, processor intensive promulgation of updates to the individual object SACLs may be avoided. For example, traditional security techniques for computer networks involve individual updating SACLs for each protected object. In contrast, by using global SACLs 122, auditing may be performed across the network 104, the computer 102, a file system, and so on while minimizing processing resource use.

For the purpose of the present discussion, the global SACL 122 that is associated with the resource (e.g., the global SACL 122) may be included in another global SACL that may be used in auditing access to the computer 102, a group of computers, a portion of the network, the network 104, and/or objects, and so on. In some embodiments, a "parent" global SACL may include a plurality of "child" global SACLs. For example, the parent global SACL may include a child global SACL associated with a filed system and a child global SACL associated with a computer implementing the file system. In other embodiments, the global SACL may be used for each resource included in a network or individual global SACLs may be included that correspond to individual resource managers. While reference is made herein to the global SACL 122, it is to be appreciated that the global SACL 122 may be provided within a hierarchy of global SACLs without departing from the spirit and scope thereof.

SACLs may be formed of access control entries (ACEs) that specify what activities are to be tracked, and so on. Access control entries may include, but are not limited to: security principals (e.g., what user, computer or group (computer or users)) are to be audited 130 (G) (in which the designation "G" is used to indicate that the access control entry is associated with the global SACL); what access mask is to be tracked (audit type, e.g., opening file, closing file, reading, writing, and so on) 132(G); and flag (e.g., successful access, failures, and so forth) 134(G). The global SACL 122 may include a resource type 140(G). By including a resource type 140(G) in the global SACL 122, the audit control module 126 "knows" which global SACL 122 to use to merge with the object SACL when the access is requested. While the forgoing is discussed with respect to the global SACL 122, a merged SACL and/or the object SACL may contain similar access control entries (and are similarly referenced, e.g., access control entries for the merged SACL are referenced with an "M").

In one or more embodiments, a group policy 138 is used by a network manager to distribute the global SACL 122 (e.g., in a list of global SACLs 142) and/or other security related parameters with the network 104 and/or the resources associated with the network 104. For example, a network manager may use the group policy 138 to define the global SACL 122, security policies, update settings, apply settings, and so on related to provide centralized security management. The group policy 138 may be used in conjunction with or as part of the operating system 114 to impose centralized security on the computer 102 or other resource. In this manner, access to resources and objects can be managed throughout the network 104 using the group policy 138 to implement consistent security and auditing of activities. For example, a network manager may distribute the global SACL 122 (that may include additional global SACLs in a hierarchical arrangement as previously described) as part of the group policy 138 to audit access to resources and/or objects.

The access control module 126 and the audit module 128 may be used by a resource manager to control and track access to the computer 102, network drives accessible through the computer 102, and so on. For example, a file manager may implement the access control module 126 and the audit module 128 when controlling access to a file system, such as a NTFS for a MICROSOFT WINDOWS OPERATING SYSTEM (which are registered trademarks of the Microsoft Corp., Redmond, Wash.). The access control module 126 and the audit module 128 may be included in the operating system's auditing subsystem, such as at a low level, e.g., a kernel level. In some embodiments, the access control module 126 and the audit module 128 may be stored in the memory 110 until called by the processor 108. While the access control module 126 and the audit module 128 are illustrated separately, the functions provided by the access control module 126 and the audit module 128 may be combined.

Figure 2:
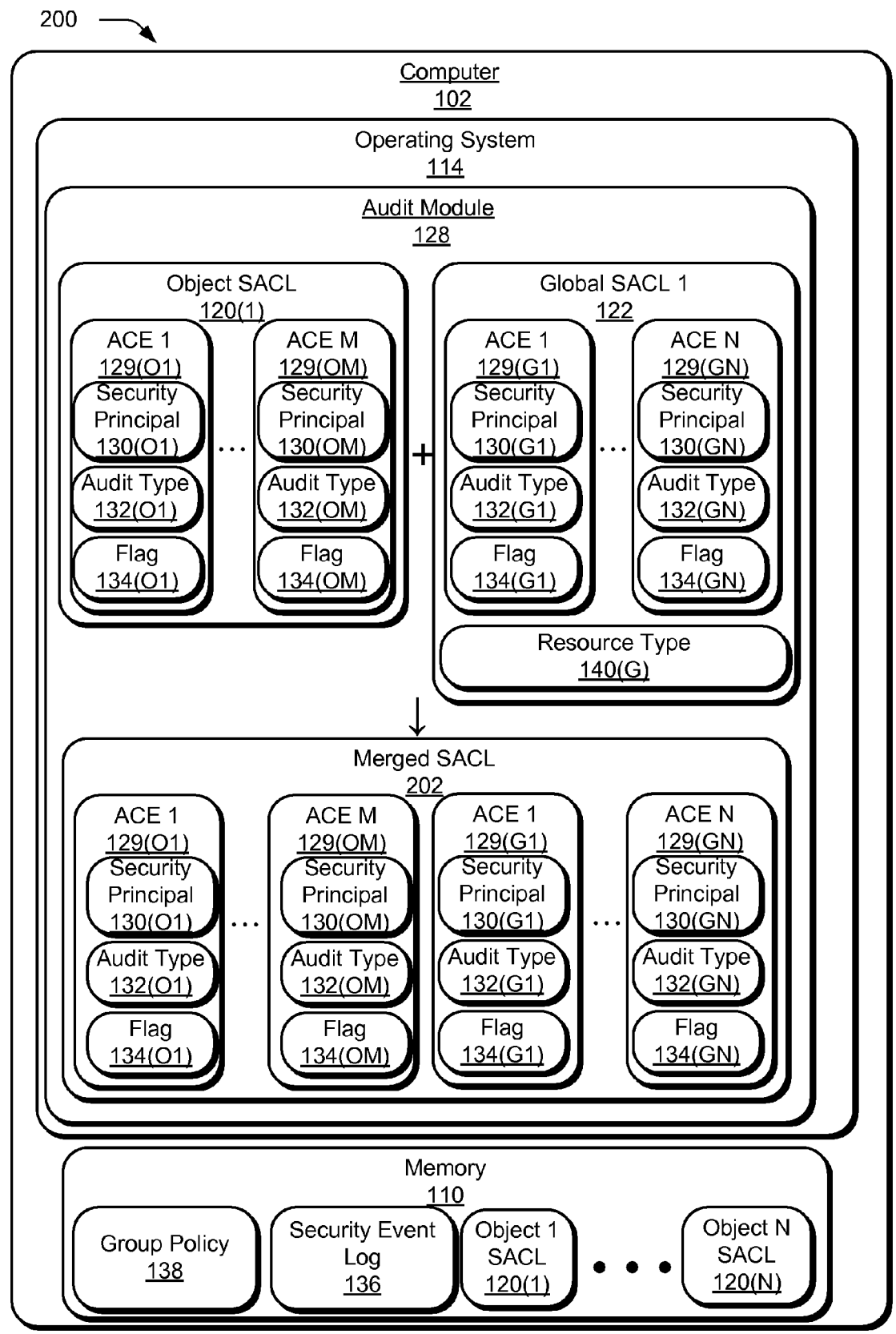
FIG. 2 is an illustration of a system in an example implementation in which a merged system access control list (SACL) is used to audit access to an object.

FIG. 2 depicts a system 200 in an example implementation in which the audit module 128 merges the global SACL 122 and a SACL for an object at runtime. For example, responsive to the request for access to the object (e.g., object "1" having an associated object SACL 120(1)), the audit module 128 may merge the global SACL 122 with the object SACL 120 (1) to form a merged SACL 202. For example, the one or more processors 108 may concatenate the global SACL 122 and object SACL 120(1) of object "1" 116(1) to form a merged SACL 202. The merged SACL 202 may correspond to a calculated union of the global and the object SACLs 122, 120(1). For example, when object SACL=ACE(ob)1 . . . ACE(ob)n and the global SACL=ACE(gl)1 . . . ACE(gl)m the merged SACL=ACE(ob)1 . . . ACE(ob)n, ACE(gl)1 . . . ACE (gl)m.

The foregoing, may avoid rote updating of SACLs for each of the plurality of objects, while ensuring that high level (e.g., network) auditing is enforced on the object. For example, if one or more of the global SACL 122 or the object SACL 120(1) indicate that closing of an object (e.g., a particular file) is to be tracked, the audit module 128 can track closing the object (e.g., the file) in the security event log 136.

The audit module 128 may use the merged SACL 202 as part of tracking activity. For example, if the merged SACL 202 specifies that opening of the object is to be tracked, the audit module 128 may generate an audit record in the security event log 136 to log the event. For example, merging may include concatenating the object SACL 120(1) and the global SACL 122 "lists". For example, concatenating global SACL 122 (including ACEs "1" 129(G1) through ACE "N" 129 (GN)) with object SACL "1" 120(1) (including ACE "1" 129(O1) through ACE "M" 129(OM)) may result in the merged SACL 202 including ACEs "1" 129(G1) through ACE "N" 129(GN) and ACE "1" 129(O1) through ACE "M" 129(OM). Thus, the audit module 128 may track activities using the merged SACL 202 based upon activities that are specified by the global SACL 122 and/or the object SACL 120(1).

Figure 3:
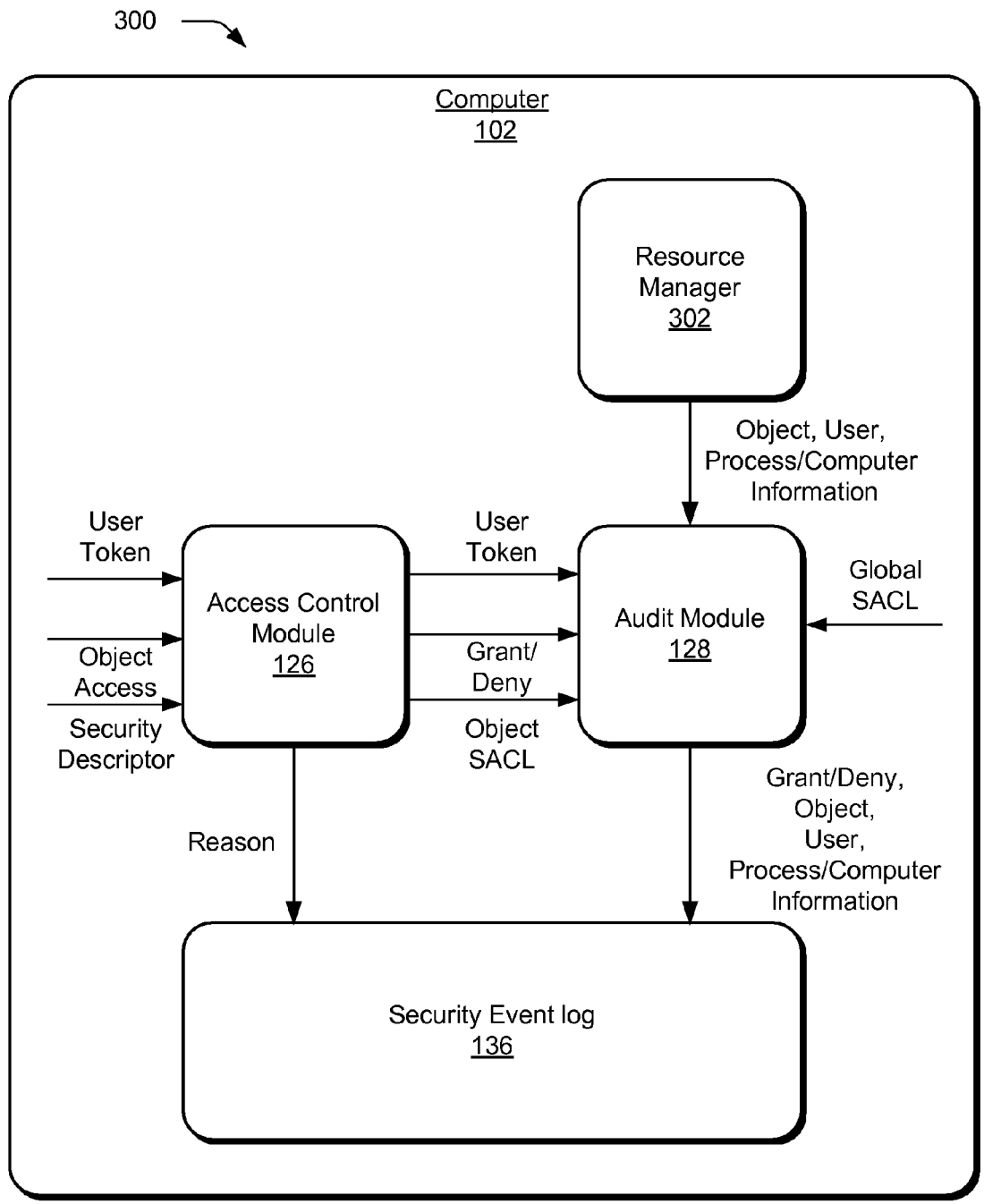
FIG. 3 is an illustration of an example implementation showing sample data flows by a system of FIGS. 1 and 2.

FIG. 3 depicts a system 300 illustrating sample data flows associated with the request for access, e.g., the access request. For example, responsive to receiving the request for an object and the identifier (e.g., the user token), the access control module 126 may obtain the security descriptor for the object targeted for access, e.g., object "1" 116(1) having object SACL 120(1). For example, upon receiving the request for access, the audit module 128 may obtain the object DACL "1" 124(1) from the security descriptor 118(1) for object "1". The access control module 126 may determine whether to permit or deny access to object "1" based on the object 1 DACL "1" 124(1). For example, if the access request is for a word processing file, the access control module 126 may check the user token with the object DACL for the file to determine whether reading the file is permitted.

As illustrated, the audit module 128 may track the attempted access (whether successful or not) so that data associated with the activity is stored, such as by generating and storing an audit record for the event in the security event log 136. In the foregoing example, when the merged SACL 202 specifies what type of activities (e.g., access, flag) are to be audited (e.g., so the audit module 128 "knows" whether the event is to be logged or not), the audit module 128 may store data associated with the activity in the security event log 138. In implementations, data obtained from a resource manager 302 may be included in the security event log 136. For example, the audit module 128 may store information such as the object, the user, process information, computer information, in the security event log 136 received from the resource manager 302 for the object.

The components, service, modules, functions, and techniques discussed above may be implemented singly or in combination based on design preference. Generally, any of the modules, services, and functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. Additionally, functions can be embodied as executable instructions that are included in one or more computer-readable storage media. The features of the procedures described below are platform-independent, meaning that the procedures may be implemented on a variety of platforms having a variety of processors and memory.

Example Procedures

The following discussion describes transformation procedures that may be implemented utilizing the previously described structures, modules, approaches, and techniques. Aspects of the procedures may be implemented in hardware, firmware, software, or a combination thereof. The procedures are shown as a set of blocks that specify operations performed by one or more devices and are not necessarily limited to the orders shown for performing the operations by the respective blocks.

Figure 4:
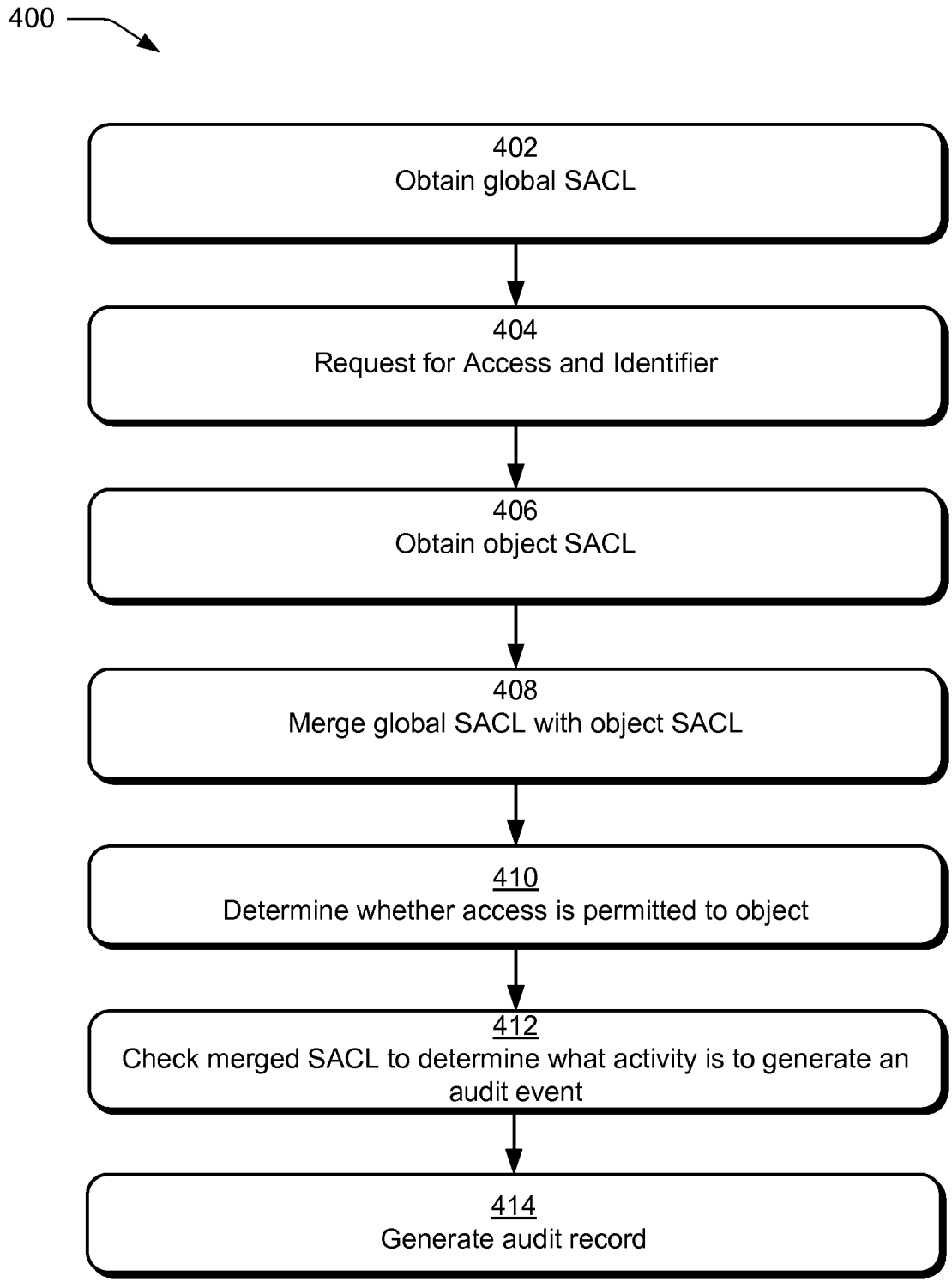
FIG. 4 is a flow diagram depicting a procedure in an example implementation using global object access auditing.

FIG. 4 depicts a procedure 400 in an example implementation using global object access control auditing. For example, the procedure may be performed by the computer 102 including the access control module 126 and/or the audit module 128 of FIGS. 1-3.

A global SACL is obtained as part of a group policy for a network (block 402). For example, periodically, a network manger may update security for the network 104 by sending an update to the group policy 138 that contains the global SACL 122 or an update to the global SACL 122. The global SACL 122 may be stored in the memory 110 until called on. The global SACL 122 may specify what activity is to be tracked for one or more of the network 104, a portion of the network 104, a computer 102, a file system, a registry, and so on.

A request for access to an object is received (block 404). The request for access may be accompanied with an identifier, such as a user token. In one or more embodiments, the request for access also may be associated with a resource. For example, a request for a media file may be associated with a media application that is used to present the data in the media file. The user token may specify data related to a user attempting to access the object. For example, the token may include user information and the groups to which it belongs, and so on.

Upon receiving the request, an object SACL is obtained for the object that is the subject of the request (block 406). For example, when a request for "Summer Vacation 2008" video is received, the access control module 126 may obtain the object SACL 120(1) for the Summer Vacation 2008 video from a security descriptor for the Summer Vacation 2008 video.

The global SACL and the object SACL are merged (block 408). For example, the global SACL 122 and the object SACL 120(1) may be concatenated to form a merged SACL 202 as described in regard to FIGS. 1 and 2. The merged SACL 202 may be the union of the global and object SACLs 122, 120(1), such that when the global SACL 122 specifies failed attempts to access the object by a specific user are to be tracked the audit module 128 using the merged SACL 202 tracks failed attempts to access the object.

An access check for the resource and/or the object is conducted (block 410). In one or more embodiments, the object DACL may be used in making a determination as to whether access is permitted to the resource and/or object. For example, the access control module 126 may use the object DACL 118(1) to determine whether the identifier (e.g., the user token) is associated with a user that is permitted access to object "1" 116(1).

The merged SACL is checked to determine what activity is to be tracked (block 412). For example, when the merged SACL 202 specifies tracking failed access attempts, the audit module 128 may store data associated with the failed access attempts in the security event log 136.

An audit record is generated corresponding to the event (block 414). Tracking of activities may be performed contemporaneously (e.g., with the grant/denial of access or other events) or on a periodic basis, e.g., after closing of the file, at a specified time interval, and so on.

Figure 5:
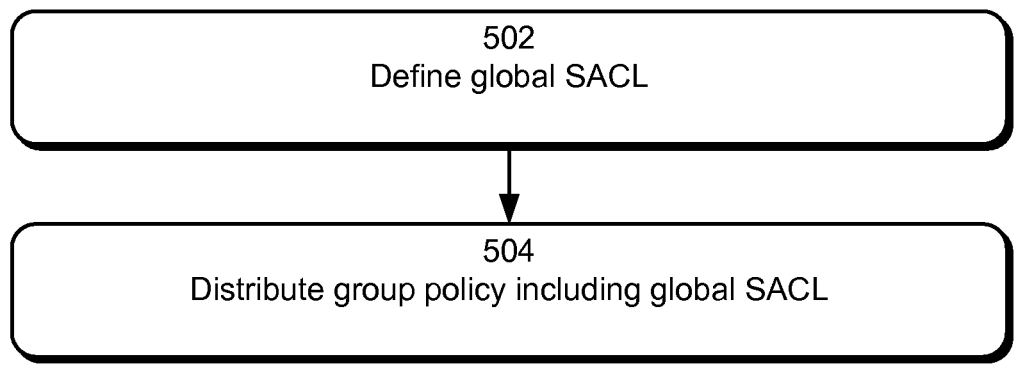
FIG. 5 is a flow diagram depicting a procedure in an example implementation that distributes a global SACL in a group policy.

FIG. 5 depicts a procedure 500 in an example implementation for distributing a global SACL. For example, the procedure may be performed by a network including the computer 102 that includes the access control module 126 and/or the audit module 128 of FIGS. 1-3. In additional implementations, the procedure 500 may be implemented with the procedure 400 of FIG. 4 or portions thereof.

A global SACL for a resource including a plurality of objects may be defined in a group policy (block 502). For example, the global SACL for the resource (e.g., the global SACL 122) may be included in another global SACL that defines aspects related to whether to grant access to resources and/or objects for the network 104. Thus, for instance, the global SACL 122 may specify what activity is tracked for files on a network drive, e.g., on the server 106. In implementations, the global SACL 122 may be periodically updated.

In one or more embodiments, the global SACL 122 may be defined in different group policy objects. In this instance, the audit module 128 may take the information from the group policy objects and combine the policies to result in the global SACL 122.

The group policy including the global SACL may be distributed to resources (block 504). For example, a network administrator may update the global SACL 122 so that requests to access to a file directory that is accessible via the network 104 are tracked. The distributed group policy 138 including the global SACL 122 may be used to update various resources on the network 104. In embodiments, the global SACL 122 may be stored in the memory 110 until called on. For example, the global SACL 122 is stored in the memory 110 until a request for access targets an object associated with the resource. In response to the access request, the audit module 128 may merge the global SACL 122 with the object SACL 120(1) for use in determining what activity is tracked.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
defining, by one or more computing devices, a global system access control list (SACL) for a resource that includes a plurality of objects, the global SACL configured to indicate one or more activities associated with the resource that are to be audited; and
distributing, by the one or more computing devices, a group policy that contains the global SACL as part of a list of SACLs, such that one or more processors associated with the resource, in response to an attempt to access to a particular said object associated with the resource, identifies the global SACL within the list of SACLs based, at least in part, on a type associated with the resource, and merges the global SACL with an object SACL for the particular said object associated with the resource to audit the attempt to access the particular said object associated with the resource, the global SACL is not promulgated among SACLs corresponding to said objects associated with resource before the attempted access to each of said objects associated with the resource.

2. The method of claim 1, wherein the particular said object associated with the resource is one or more of:
a file included on a networked computer,
a folder including one or more said objects, or
a registry key.

3. The method of claim 1, wherein one or more of the global SACL or the object SACL include one or more of:
a security principal to be audited,
a security attribute,
an access mask that indicates what access type is to be audited; or
a flag.

4. The method of claim 1, wherein one or more of the global SACL or the object SACL include a security principal that is associated with one or more of:
a user that is to be audited,
a computing device, or
a group of users that is to be audited.

5. The method of claim 1, further comprising determining whether access to the particular said object associated with the resource is permitted using a discretionary access control list (DACL).

6. The method of claim 1, wherein the group policy is configured to cause one or more processors associated with the resource to calculate a union of the global SACL and the object SACL, responsive to the attempted access to the particular said object.

7. The method of claim 1, the global SACL including an entry designating whether to track failed access attempts to particular said object associated with the resource.

8. A method comprising:
responsive to a request for access to an object associated with a resource, merging, using a computing device, a global system access control list (SACL) for the resource with an object SACL for the object to form a merged SACL, the global SACL determined based, at least in part, on a resource type contained within the global SACL, the merging comprising selecting the global SACL from a list of global SACLs using the resource type, the global SACL is further configured to indicate, for a plurality of objects, one or more activities associated with the resource that are to be audited for an object of the plurality of objects, and the object SACL is configured to indicate one or more activities associated with the object of the plurality of objects that are to be audited; and
checking, using the computing device, the merged SACL to determine what activity is to generate an audit event.

9. The method of claim 8, further comprising generating, using the computing device, an audit record including data in an identifier associated with the request.

10. The method of claim 9, further comprising forwarding the generated audit record to centralized storage.

11. The method of claim 8, wherein one or more of the global SACL or the object SACL include one or more of:
a security principal to be audited,
a security attribute,
an access mask that indicates what access type is to be audited, or
a flag.

12. The method of claim 8, wherein the resource is one or more of:
a file system,
an application,
a registry, or
a directory service.

13. The method of claim 8, wherein merging includes concatenating the global SACL and the object SACL.

14. The method of claim 8, wherein the global SACL for the resource is not promulgated among SACLs for objects included in the resource prior to the request to for access.

15. The method of claim 8, wherein checking includes tracking an outcome of the request in a security event log.

16. One or more computer-readable storage media device comprising instructions that are executable by a computer to:
check a merged system access control list (SACL) to determine what activity associated with a resource is to generate an audit event, in which the merged SACL is concatenated from a global SACL for a file system that includes an object and an object SACL for the object, the instructions further configured to concatenate the global SACL and the object SACL responsive to a request for access to the object associated with the resource, the global SACL configured to indicate, for a plurality of objects, one or more activities associated with the resource that are to be audited for an object of the plurality of objects, the object SACL configured to indicate one or more activities associated with the object of the plurality of objects that are to be audited; and
generate an audit record corresponding to the audit event, wherein to generate the audit record includes an ability to generate the audit record on a periodic basis.

17. One or more computer-readable storage media device as described in claim 16, wherein the audit record is associated with one or more of:
a failure to access the file system,
a successful file system access,
a failure to access said object, or
a successful object access.

18. One or more computer-readable storage media device as described in claim 16, wherein one or more of the global SACL, the merged SACL, or the object SACL include one or more of:
a security principal to be audited,
a security attribute,
an access mask that indicates what access type is to be audited, or
a flag.

19. One or more computer-readable storage media device as described in claim 16, wherein the file system is associated with an operating system that is to be executed on a computer that is to execute the instructions.

20. One or more computer-readable storage media device as described in claim 16, wherein the merged SACL is a union of the global SACL and the object SACL.

* * * * *